United States Patent
Jiang

(10) Patent No.: US 10,027,693 B2
(45) Date of Patent: Jul. 17, 2018

(54) METHOD, DEVICE AND SYSTEM FOR ALERTING AGAINST UNKNOWN MALICIOUS CODES WITHIN A NETWORK ENVIRONMENT

(71) Applicant: Huawei Digital Technologies (Cheng Du) Co., Limited, Chengdu (CN)

(72) Inventor: Wu Jiang, Beijing (CN)

(73) Assignee: Huawei Digital Technologies (Cheng Du) Co., Limited, Chengdu (CN)

( * ) Notice: Subject to any disclaimer, the term of this patent is extended or adjusted under 35 U.S.C. 154(b) by 266 days.

(21) Appl. No.: 15/081,018

(22) Filed: Mar. 25, 2016

(65) Prior Publication Data

US 2016/0212160 A1    Jul. 21, 2016

Related U.S. Application Data

(63) Continuation-in-part of application No. 13/481,273, filed on May 25, 2012, now Pat. No. 9,674,206, (Continued)

(30) Foreign Application Priority Data

Nov. 26, 2009   (CN) .......................... 2009 1 0247172

(51) Int. Cl.
    *H04L 29/06*   (2006.01)
    *G06F 21/55*   (2013.01)

(52) U.S. Cl.
    CPC ...... *H04L 63/1416* (2013.01); *H04L 63/1425* (2013.01); *G06F 21/55* (2013.01); *H04L 63/1408* (2013.01); *H04L 2463/146* (2013.01)

(58) Field of Classification Search
    CPC .......................... G06F 21/55; H04L 63/1408
    (Continued)

(56) References Cited

U.S. PATENT DOCUMENTS 7,007,302 B1   2/2006   Jagger et al.
8,201,247 B1   6/2012   Chen et al.
(Continued)

FOREIGN PATENT DOCUMENTS

CN       1997017 A        7/2007
CN     101052934 A       10/2007
(Continued)

OTHER PUBLICATIONS

1st Office Action in corresponding U.S. Appl. No. 13/481,273 (dated Mar. 28, 2013).
(Continued)

*Primary Examiner* — Bryan Wright
(74) *Attorney, Agent, or Firm* — Leydig, Voit & Mayer, Ltd.

(57) ABSTRACT

A method, a device, and a system for alerting against unknown malicious codes includes judging whether any suspicious code exists in the packet, recording a source path of the suspicious code and sending alert information that carries the source path to a monitoring device. The embodiments of the present disclosure report the source paths of suspicious codes proactively at the earliest possible time, which lays a foundation for shortening the time required for overcoming virus threats, and avoids the trouble of installing software on the terminal.

9 Claims, 4 Drawing Sheets

Related U.S. Application Data which is a continuation of application No. PCT/CN2010/078951, filed on Nov. 22, 2010.

(58) Field of Classification Search
USPC .......................................................... 726/23
See application file for complete search history.

(56) References Cited

U.S. PATENT DOCUMENTS

| | | | | |
|---|---|---|---|---|
| 8,555,388 B1* | 10/2013 | Wang | ................ | H04L 63/1416 709/245 |
| 8,578,493 B1* | 11/2013 | Cowan | ................ | G06F 21/554 709/224 |
| 8,826,438 B2* | 9/2014 | Perdisci | ................ | G06F 21/56 709/236 |
| 9,215,239 B1* | 12/2015 | Wang | ................ | H04L 63/1408 |
| 2003/0009699 A1 | 1/2003 | Gupta et al. | | |
| 2004/0148281 A1 | 7/2004 | Bates et al. | | |
| 2006/0021040 A1 | 1/2006 | Boulanger et al. | | |
| 2008/0162715 A1 | 7/2008 | Wary | | |
| 2008/0313738 A1 | 12/2008 | Enderby | | |
| 2009/0113548 A1* | 4/2009 | Gray | ................ | G06F 21/552 726/24 |
| 2012/0054869 A1* | 3/2012 | Yen | ................ | H04L 29/12066 726/24 |
| 2012/0151033 A1* | 6/2012 | Baliga | ................ | H04L 63/1425 709/224 |
| 2012/0233691 A1 | 9/2012 | Jiang | | |
| 2014/0013434 A1* | 1/2014 | Ranum | ................ | H04L 63/145 726/24 |

FOREIGN PATENT DOCUMENTS

| | | |
|---|---|---|
| CN | 101212753 A | 7/2008 |
| CN | 101242416 A | 8/2008 |
| CN | 101286850 A | 10/2008 |
| CN | 101587521 A | 11/2009 |
| CN | 101714931 A | 5/2010 |
| EP | 1461704 B1 | 8/2014 |
| KR | 20090078691 A | 7/2009 |

OTHER PUBLICATIONS $2^{nd}$ Office Action in corresponding U.S. Appl. No. 13/481,273 (dated Sep. 26, 2013).

* cited by examiner

METHOD, DEVICE AND SYSTEM FOR ALERTING AGAINST UNKNOWN MALICIOUS CODES WITHIN A NETWORK ENVIRONMENT

CROSS-REFERENCE TO RELATED APPLICATION

This application is a continuation-in-part application of a U.S. patent application Ser. No. 13/481,273, filed on May 25, 2012, which is a continuation of International Patent Application No. PCT/CN2010/078951, filed on Nov. 22, 2010, which claims priority to Chinese Patent Application No. 200910247172.8, filed on Nov. 26, 2009. The aforementioned patent applications are hereby incorporated by reference in their entireties.

TECHNICAL FIELD

The present disclosure relates to network security technologies, and in particular, to a method, a device, and a system for alerting against unknown malicious codes.

BACKGROUND

With popularization of the Internet, higher network security is required. Loopholes are frequently used for launching attacks. The time from discovery to use of a security loophole is now shortened from a few months to a few days. Once a loophole is discovered, it is used for launching attacks shortly. For such attacks, it usually takes a long time for the vendor to obtain a sample of malicious codes, and it is slower to release the corresponding patches. Therefore, such attacks tend to cause huge damages. MS Blast was used for launching attacks hardly in less than 25 days after it was discovered, and Nachi (a variant of MS Blast) was used for launching attacks in less than one week after it was discovered. If the malicious codes are discovered early, the attacks can be prevented in time, and the loss caused by malicious codes will be reduced.

In the conventional art, network devices are unable to report suspicious codes. After the malicious code attack is launched, it takes a long time for the vendor to obtain the malicious code sample. Antivirus software analyzes files downloaded to the computer and reports the analysis result to the monitoring center. However, the computer may still be attacked by downloaded malicious codes if the downloaded data is not treated properly, which brings a heavy burden onto the computer. Antivirus software has to be installed on the computer, which is troublesome to the user. For such reasons, some users refuse to install antivirus software on network devices so that such devices are more vulnerable to propagation of malicious codes.

SUMMARY

An embodiment of the present disclosure provides a method, a device, and a system for alerting against unknown malicious codes, so as to report source path of numerous suspicious codes proactively at the earliest possible time, lay a foundation for shortening the time required for overcoming virus threats, and avoid the trouble of installing software on the terminal.

An embodiment of the present disclosure provides a method for alerting against unknown malicious codes, including:

receiving, by a network device, a request sent by a terminal for obtaining a file from a network entity and a data stream carrying the file;

recording, by the network device, a source path carried in the request, wherein the network entity providing the file on the source path;

judging, by the network device, whether the file is an executable file according to the request or the data stream carried the file; and sending, by the network device, first alert information that carries the source path to a monitoring device, if the network device judges the file is the executable file.

An embodiment of the present disclosure provides a network device, including:

a receiving module, configured to receive a request sent by a terminal for obtaining a file from a network entity and receive a data stream carrying the file;

a recording module, configured to record a source path carried in the request, wherein the network entity providing the file on the source path;

a detecting module, configured to judge whether the file is an executable file according to the request or the data stream carried the file; and a sending module, configured to send first alert information that carries the source path to a monitoring device, if the network device judges the file is the executable file.

An embodiment of the present disclosure provides a system for alerting against unknown malicious codes. The system includes a network device according to above and a monitoring device, where the monitoring device is configure to receive first alert information that carries a source path sent from the network device; download an executable file according to the source path; detect the executable file to confirm maliciousness of the executable file; send second alarm information to the network device, wherein the second alarm information comprises maliciousness of the executable file, or comprises both the maliciousness of the executable and Botnet topology information.

Therefore, the method, the device, and the system for alerting against unknown malicious codes in the embodiments of the present disclosure report source path of numerous suspicious codes proactively at the earliest possible time, enable the vendor to obtain the source path of malicious code samples shortly after the malicious codes occur, ensure comprehensiveness of the alert information source, lay a foundation for shortening the time required for overcoming virus threats, and avoid the trouble of installing software on the terminal.

BRIEF DESCRIPTION OF THE DRAWINGS

To make the technical solution under the present disclosure or in the conventional art clearer, the following outlines the accompanying drawings involved in the description of the embodiments of the present disclosure or the conventional art. Apparently, the accompanying drawings outlined below are illustrative rather than exhaustive, and persons of ordinary skill in the art can derive other drawings from them without any creative effort.

DETAILED DESCRIPTION OF THE EMBODIMENTS

The following detailed description is given in conjunction with the accompanying drawings to provide a thorough understanding of the present disclosure. Evidently, the drawings and the detailed description are merely representative of particular embodiments of the present disclosure rather than all embodiments. All other embodiments, which can be derived by those skilled in the art from the embodiments given herein without any creative effort, shall fall within the protection scope of the present disclosure.

The following describes the technical solution of the present disclosure in detail.

Figure 1:
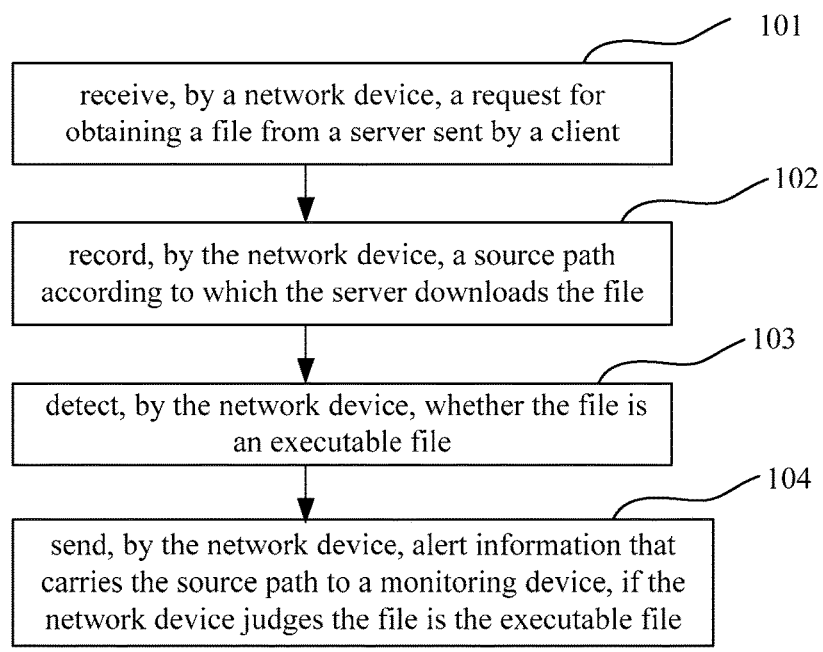
FIG. 1 is a schematic diagram of a method for alerting against unknown malicious codes according to an embodiment of the present disclosure.

FIG. 1 is a schematic diagram of a method for alerting against unknown malicious codes according to an embodiment of the present disclosure. The method in this embodiment includes the following steps:

Step 101: receive, by a network device, a request sent by a terminal for obtaining a file from a network entity and a data stream carrying the file;

Step 102: record, by the network device, a source path carried in the request, wherein the network entity providing the file on the source path;

Step 103: judge, by the network device, whether the file is an executable file according to the request or the data stream carried the file; and Step 104: send, by the network device, first alert information that carries the source path to a monitoring device, if the network device judges the file is the executable file.

The entity for performing the steps of this embodiment is a network device. The source path is sent to the monitoring device so that the monitoring device could download the file according to the source path, and detect the executable file to confirm maliciousness of the executable file in time.

In this embodiment, whether the file is an executable file is detected. When the file is an executable file, then it is regards as suspicious codes. For example, the detection method is to detect whether a string which indicating the name of the executable file exists in the request, and/or whether a file header of the executable file exists in the data returned by the server.

In this embodiment, the terminal sends the request for obtaining the file from the network entity, especially, the network entity is server providing the file on the source path, for example, the network entity is a Web server of a FTP (File Transfer Protocol) server.

The request may be an HTTP get request or an FTP request, wherein the request contains the source path according to which the server providing the file.

The network device may be a network gateway device between the terminal and the network entity. The network device will receive the request. After the network device receiving the request, the network device records a source path according to which the server providing the file. The source path generally appears in the URL after get.

The network device, detects whether the file is an executable file. The detecting, by the network device, whether the file is the executable file comprises:

detecting, by the network device, whether a string which indicating the name of the executable file exists in the request; and/or detecting, by the network device, whether a file header of the executable file exists in the data which transmitted by the data stream returned by the server.

Specifically, at the time of detecting whether a string which indicating the name of the executable file exists in the request, if a string like get *.exe is detected in the packet, it indicates that an executable file is being transmitted, in which *.exe is a suspicious code, and * represents a string of a random length. The executable file may leak information of the terminal user, damage the terminal system, or even let the terminal be controlled by the attacker. Or, if a packet includes strings like get *.dll or get *.ocx, it indicates that an executable file, that is a string of malicious codes is being transmitted, which may leak information of the terminal user, damage the terminal system, or even let the terminal be controlled by the attacker. Such codes need to be reported.

At the time of detecting whether a file header of the executable file exists in the file returned by the server, if a PE (portable executable) file header characteristic code "MZ" is detected (MZ is expressed by American Standard Code for Information Interchange (ASCII) codes), the PE file may leak information of the terminal user, damage the terminal system, or even let the terminal be controlled by the attacker when the PE file is executed. Therefore, the PE file is a string of suspicious codes.

When the two detection methods above are combined, if get *.jpg is detected and a PE file header characteristic code "MZ" is detected (MZ is expressed by ASCII codes) in the corresponding data, the PE file is a string of suspicious codes, because the user attempts to download a picture but an executable file is returned. The spoofing indicates that the PE file is probably is a string of malicious codes.

If the suspicious code is detected by checking whether the name of the executable file is included in the data stream, the source path generally appears in the URL after get. If both of the detection methods are applied in detecting the executable file, the source address generally appears in the URL after get, If the network device judges the file is the executable file, the network device generates first alert information that carries the source path and sends the first alert information to the monitoring device. After the first alert information is sent, the network device receives second alarm information returned by the monitoring device.

The method for alerting against unknown malicious codes in this embodiment reports source path of numerous suspicious codes proactively at the earliest possible time, enables the vendor to obtain the source path of malicious code samples shortly after the malicious codes occur, ensures comprehensiveness of the alert information source, lays a foundation for shortening the time required for overcoming virus threats, and avoids the trouble of installing software on the terminal.

Figure 2:
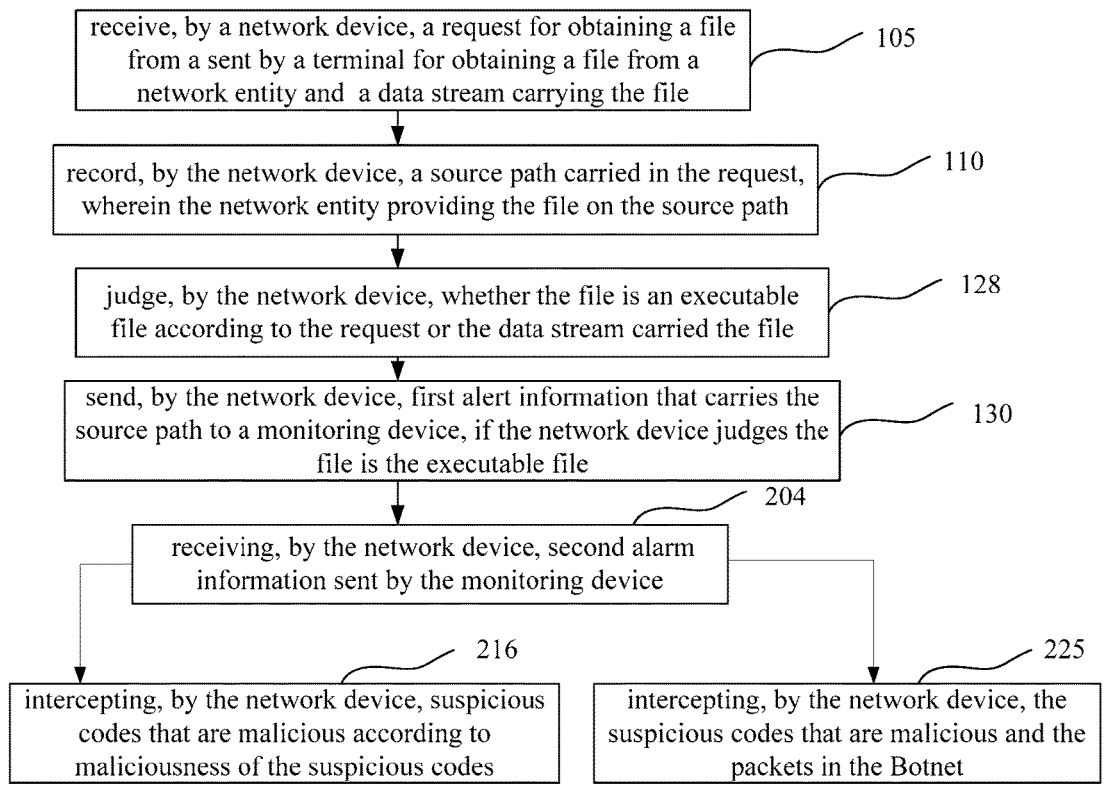
FIG. 2 is a schematic diagram of a method for alerting against unknown malicious codes according to an embodiment of the present disclosure.

FIG. 2 is a schematic diagram of a method for alerting against unknown malicious codes according to an embodiment of the present disclosure. The method in this embodiment includes the following steps:

Step 105: receiving, by a network device, a request for obtaining a file from a sent by a terminal for obtaining a file from a network entity;

receiving, by a network device, a data stream carrying the file;

Step 110: recording, by the network device, a source path carried in the request, wherein the network entity providing the file on the source path;

Step 128: judging, by the network device, whether the file is an executable file according to the request or the data stream carried the file;

Step 130: sending, by the network device, first alert information that carries the source path to a monitoring device, if the network device judges the file is the executable file;

Step 204: receiving, by the network device, second alarm information sent by the monitoring device. The second alarm information includes maliciousness of the suspicious code, or includes both the maliciousness of the suspicious code and the Botnet topology information.

This embodiment differs from the previous embodiment in that: the network device receives second alarm information returned by the monitoring device after sending first alert information. The second alarm information includes maliciousness of the suspicious code against which the alert is raised, or includes both the maliciousness of the suspicious code and the Botnet topology information.

The monitoring device may identify maliciousness of the suspicious code through characteristics detection, sandbox test, or both.

If the monitoring device uses characteristics detection to calculate possibility of maliciousness, the monitoring device compares the suspicious code with a more detailed repository of malicious code characteristics. If the suspicious code matches any characteristics in the repository of malicious code characteristics, the monitoring device can calculate the probability of attacks launched by the malicious code according to the matching extent, and identify possibility of such attacks, namely, maliciousness possibility. For example, if the suspicious code matches a string of suspicious code characteristics regarded as having an 80% probability of launching attacks in the characteristics repository, the suspicious code is also regarded as having an 80% probability of launching attacks. If this probability exceeds the alarm threshold, the suspicious code is possibly malicious.

If the monitoring device uses a sandbox to calculate the maliciousness possibility, the monitoring device runs the suspicious code in the sandbox automatically, records the execution result and the running status, and calculates the maliciousness possibility according to the record. The sandbox is a professional virtual environment. The program that runs in the sandbox is redirected into the sandbox when modifying a registry or a file. In this way, if the program is malicious, no impact is caused outside the sandbox. Even if an attack is launched in the sandbox, the attack impact is cancelled by restarting the sandbox. For example, the monitoring device detects that a malicious event is triggered in the process of running a suspicious code, and the probability of launching attacks from the event is 40%. Therefore, the maliciousness possibility of the suspicious code is 40%. If this probability exceeds the alarm threshold, the suspicious code is possibly malicious.

If the suspicious code that the monitoring device downloads according to the first alert information is determined as malicious, the monitoring device may retrieve the Botnet topology information in the malicious code, and generates and sends second alarm information that carries the Botnet topology information.

The Botnet topology information in the foregoing malicious code includes Bot hosts as well as the Internet Protocol (IP) address, port, or Uniform Resource Locator (URL) that controls the hosts.

After the monitoring device sends the second alarm information that carries the Botnet topology information, the network device receives the alarm information sent by the monitoring device. The second alarm information includes maliciousness of the suspicious code, or includes both the maliciousness of the suspicious code and the Botnet topology information.

The method in this embodiment may further include the following steps:

Step 216: intercepting, by the network device, suspicious codes that are malicious according to maliciousness of the suspicious codes; or Step 225: intercepting, by the network device, the suspicious codes that are malicious and the packets in the Botnet corresponding to the Botnet topology information according to maliciousness of the suspicious codes and the Botnet topology information.

After receiving the second alarm information, the network device intercepts the corresponding suspicious codes and the packets in the Botnet.

The method for alerting against unknown malicious codes in this embodiment reports source path of numerous suspicious codes proactively at the earliest possible time, ensures comprehensiveness of the alert information sources, lays a foundation for shortening the time required for overcoming virus threats, and avoids the trouble of installing software on the terminal. Moreover, because the network device sends the source path of the suspicious codes rather than the suspicious codes themselves, the occupancy of user bandwidth is reduced; the monitoring device analyzes the suspicious codes and sends alarms to the network device so that the network device can intercept malicious codes; the monitoring device retrieves the Botnet topology information and sends Botnet alarms to the network device, and therefore, the network device intercepts the packets in the Botnet, which reduces possibility of the host being attacked.

Figure 3:
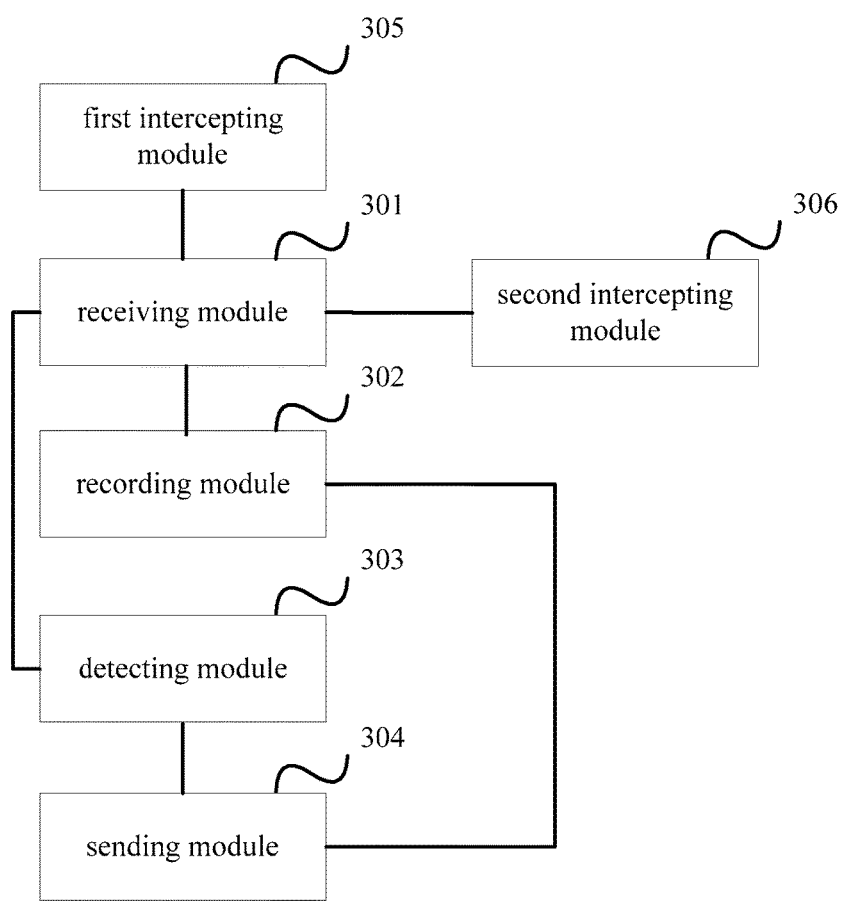
FIG. 3 is a schematic diagram of a network device according to an embodiment of the present disclosure.

FIG. 3 is a schematic diagram of a network device according to an embodiment of the present disclosure. The network device in this embodiment includes:

a receiving module 301, configured to receive a request sent by a terminal for obtaining a file from a network entity and receive a data stream carrying the file;

a recording module 302, configured to record a source path carried in the request, wherein the network entity providing the file on the source path;

a detecting module 303, configured to judge whether the file is an executable file according to the request or the data stream carried the file; and a sending module 304, configured to send first alert information that carries the source path to a monitoring device, if the network device judges the file is the executable file.

In this embodiment, the detecting module detects characteristics of the packet to detect the suspicious code, for example, by detecting whether a string which indicating the name of the executable file exists in the request; and/or detecting whether a file header of the executable file exists in the data returned by the server. The recording module records the source path of the suspicious code. The sending module sends first alert information to the monitoring device.

This embodiment may further include:

the receiving module 301 is further configured to receive second alarm information sent by the monitoring device after further detecting the file downloaded according to the source path by the monitoring device, where the second alarm information includes maliciousness of the suspicious code, or includes both the maliciousness of the suspicious code and the Botnet topology information.

Accordingly, this embodiment may further include:

a first intercepting module 305, configured to intercept suspicious codes that are malicious according to maliciousness of the suspicious codes; or a second intercepting module 306, configured to intercept the suspicious codes that are malicious and the packets in the Botnet corresponding to the Botnet topology information according to maliciousness of the suspicious codes and the Botnet topology information.

The network device provided in this embodiment reports source path of numerous suspicious codes proactively at the earliest possible time, ensures comprehensiveness of the alert information sources, lays a foundation for shortening the time required for overcoming virus threats, and avoids the trouble of installing software on the terminal. Moreover, the first receiving module receives the alarm information from the monitoring device, and therefore, the network device interrupts malicious codes and the packets in the Botnet, which reduces the possibility of the host being attacked.

Figure 4:
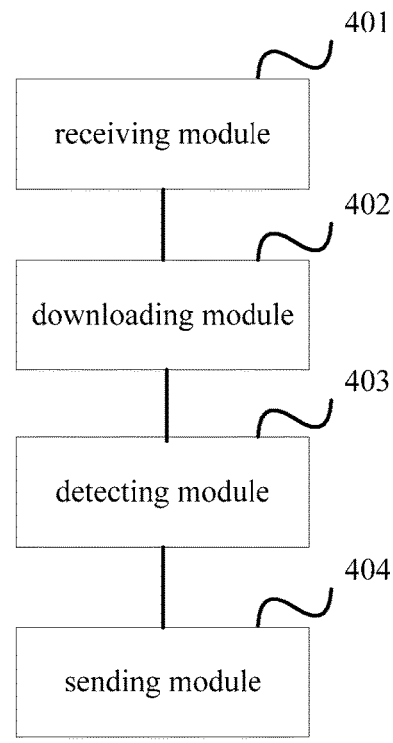
FIG. 4 is a schematic diagram of a monitoring device according to an embodiment of the present disclosure.

FIG. 4 is a schematic diagram of the monitoring device, comprising:

a receiving module 401, configured to receive first alert information that carries a source path sent from a network device;

a downloading module 402, configured to download an executable file according to the source path;

a detecting module 403, configured to detect the executable file to confirm maliciousness of the executable file; and a sending module 404, configured to send second alarm information to the network device, wherein the second alarm information comprises maliciousness of the executable file, or comprises both the maliciousness of the executable and Botnet topology information.

Figure 5:
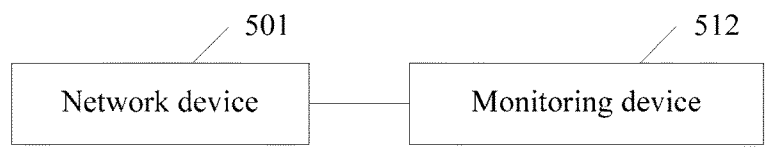
FIG. 5 is a schematic diagram of a system for alerting against unknown malicious codes according to an embodiment of the present disclosure.

FIG. 5 is a schematic diagram of system for alerting against unknown malicious codes according to an embodiment of the present disclosure. The system in this embodiment includes the network device 501 and the monitoring device 512 shown in FIG. 5.

An embodiment of the present disclosure provides a system for alerting against unknown malicious codes. The system collects source path of numerous suspicious codes proactively at the earliest possible time, ensures comprehensiveness of the alert information sources, lays a foundation for shortening the time required for overcoming virus threats, and avoids the trouble of installing software on the terminal.

After reading the foregoing embodiments, those skilled in the art are clearly aware that the embodiments of the present disclosure may be implemented through hardware, or, preferably in most circumstances, through software in addition to a necessary universal hardware platform. Therefore, all or part of the novelty of the present disclosure may be embodied in a software product. The software product may be stored in storage media such as a read-only memory (ROM) or random access memory (RAM), magnetic disk, or Compact Disc Read-Only Memory (CD-ROM), and incorporate several instructions for instructing a computer device (such as personal computer, server, or network device) to execute the method specified in any embodiment of the present disclosure or a part of the embodiment.

Finally, it should be noted that the above embodiments are merely provided for describing the technical solutions of the present disclosure, but not intended to limit the present disclosure. It is apparent that persons skilled in the art can make various modifications and variations to the disclosure without departing from the spirit and scope of the disclosure. The present disclosure is intended to cover the modifications and variations provided that they fall in the scope of protection defined by the following claims or their equivalents.

What is claimed is:

1. A method for alerting against unknown malicious codes, the method comprising:

receiving, by a network device, a request sent by a terminal for obtaining a file from a network entity and a data stream carrying the file;

recording, by the network device, a source path carried in the request, wherein the network entity provides the file on the source path;

judging, by the network device, whether the file is an executable file according to at least one of: the request and the data stream carrying the file;

when the network device judges the file is an executable file, sending, by the network device, first alert information that carries the source path to a monitoring device;

receiving, by the network device, second alarm information sent by the monitoring device after further detecting the file downloaded according to the source path by the monitoring device; and intercepting, by the network device,
a) the executable file according to the second alarm information comprising a maliciousness of the executable file; or
b) the executable file and packets transmitted in a Botnet according to the second alarm information comprising the maliciousness of the executable file and Botnet topology information.

2. The method according to claim 1, wherein the judging, by the network device, whether the file is the executable file according to at least one of: the request and the data stream carrying the file comprises at least one of:

detecting, by the network device, whether a string which indicates a name of the executable file exists in the request; and detecting, by the network device, whether a file header of the executable file exists in the data stream-returned by the network entity.

3. A network device comprising computing hardware and a non-transitory computer-readable storage medium including computer-executable instructions executed by the computing hardware to perform, on the network device, operations comprising:

receiving a request sent by a terminal for obtaining a file from a network entity and receiving a data stream carrying the file;

recording a source path carried in the request, wherein the network entity provides the file on the source path;

judging the file is an executable file according to at least one of: the request and the data stream carrying the file;

when the network device judges the file is the executable file, sending first alert information that carries the source path to a monitoring device;

receiving second alarm information sent by the monitoring device sent by the monitoring device after further detecting the file downloaded according to the source path by the monitoring device, wherein the second alarm information includes (a) a maliciousness of the executable file or (b) the maliciousness of the executable file and Botnet topology information; and intercepting
  i. the executable file according to one of the maliciousness of the executable file; or
  ii. the executable file and packets transmitted in a Botnet according to the second alarm information comprising the maliciousness of the executable file and Botnet topology information.

4. The network device according to claim 3, wherein the judging whether the file is an executable file according to at least one of: the request and the data stream carrying the file comprises at least one of:
  detecting whether a string which indicates a name of the executable file exists in the request; and
  detecting whether a file header of the executable file exists in the data stream received from the network entity.

5. A system for alerting against unknown malicious codes comprising a network device and a monitoring device:
  the network device comprising a first computing hardware and a first non-transitory computer-readable storage medium including a first set of computer-executable instructions executed by the first computing hardware to perform, on the network device, operations comprising:
    a) receiving a request sent by a terminal for obtaining a file from a network entity and receiving a data stream carrying the file;
    b) recording a source path carried in the request, wherein the network entity provides the file on the source path;
    c) determining the file is an executable file according to at least one of (a) the received request and (b) the data stream carrying the file;
    d) sending first alert information that carries the source path to a monitoring device when the network device determines the file is an executable file;
    e) receiving second alarm information sent by the monitoring device after detecting the executable file downloaded according to the source path; and
    f) intercepting
      i. the executable file according to one of the maliciousness of the executable file; or
      ii. the executable file and packets transmitted in a Botnet according to the second alarm information comprising the maliciousness of the executable file and Botnet topology information; and
  the monitoring device comprising a second computing hardware and a second non-transitory computer-readable storage medium including a second set of computer-executable instructions executed by the second computing hardware to perform, on the monitoring device, operations comprising:
    a) receiving the first alert information from the network device;
    b) downloading an executable file according to the source path;
    c) detecting the executable file to confirm maliciousness of the executable file; and
    d) sending the second alarm information to the network device, wherein the second alarm information comprises one of: maliciousness of the executable file, and both the maliciousness of the executable file and Botnet topology information.

6. The system for alerting against unknown malicious codes according to claim 5,
  wherein the operations performed on the monitoring device further comprise at least one of:
  detecting maliciousness of the executable file by characteristics detection; and
  detecting maliciousness of the executable file by sandbox test.

7. The system for alerting against unknown malicious codes according to claim 5, wherein determining the file is an executable file according to at least one of: the request sent by the terminal and the data stream carrying the file, and determining the file is an executable file includes at least one of:
  a) detecting whether a string which indicates a name of the executable file exists in the request; and
  b) detecting whether a file header of the executable file exists in the data stream received from the network entity.

8. A non-transitory computer readable medium storing instructions for execution by a processor, the instructions causing the processor to be configured to provide the following:
  receive a request sent by a terminal for obtaining a file from a network entity and receive a data stream carrying the file;
  record a source path carried in the request, wherein the network entity provides the file on the source path;
  determine whether the file is an executable file according to (a) the request or (b) the data stream carrying the file;
  send first alert information that carries the source path to a monitoring device, if the network device judges the file is the executable file;
  receive second alarm information that includes (a) a maliciousness of the executable file or (b) the maliciousness of the executable file and Botnet topology information; and
  intercepting
    a) the executable file according to one of the maliciousness of the executable file; or
    b) the executable file and packets transmitted in a Botnet according to the second alarm information comprising the maliciousness of the executable file and Botnet topology information.

9. The network device according to claim 8, wherein determining the file is an executable file according to the request or the data stream carrying the file comprises:
  detecting whether a string which indicates the name of the executable file exists in the request; and/or
  detecting whether a file header of the executable file exists in the data, which is transmitted by the data stream returned by the network entity.

* * * * *

(12) INTER PARTES REVIEW CERTIFICATE (3318th)

United States Patent
Jiang

(10) Number: US 10,027,693 K1
(45) Certificate Issued: Nov. 13, 2023

(54) METHOD, DEVICE AND SYSTEM FOR ALERTING AGAINST UNKNOWN MALICIOUS CODES WITHIN A NETWORK ENVIRONMENT

(71) Applicant: Wu Jiang

(72) Inventor: Wu Jiang

(73) Assignee: HUAWEI TECHNOLOGIES CO., LTD.

Trial Number:

IPR2020-01130 filed Jun. 17, 2020

Inter Partes Review Certificate for:

Patent No.: 10,027,693
Issued: Jul. 17, 2018
Appl. No.: 15/081,018
Filed: Mar. 25, 2016

The results of IPR2020-01130 are reflected in this inter partes review certificate under 35 U.S.C. 318(b).

INTER PARTES REVIEW CERTIFICATE
U.S. Patent 10,027,693 K1
Trial No. IPR2020-01130
Certificate Issued Nov. 13, 2023

AS A RESULT OF THE INTER PARTES REVIEW PROCEEDING, IT HAS BEEN DETERMINED THAT:

Claims 1-7 are found patentable.

Claims 8 and 9 are cancelled.

\* \* \* \* \*